Feb. 21, 1956  O. R. DECKERT  2,735,136
FOOD PROCESSING MACHINE
Original Filed Nov. 24, 1948  2 Sheets-Sheet 1

Feb. 21, 1956     O. R. DECKERT     2,735,136
FOOD PROCESSING MACHINE
Original Filed Nov. 24, 1948     2 Sheets-Sheet 2
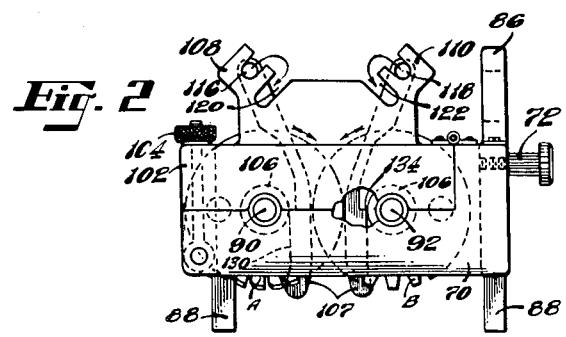
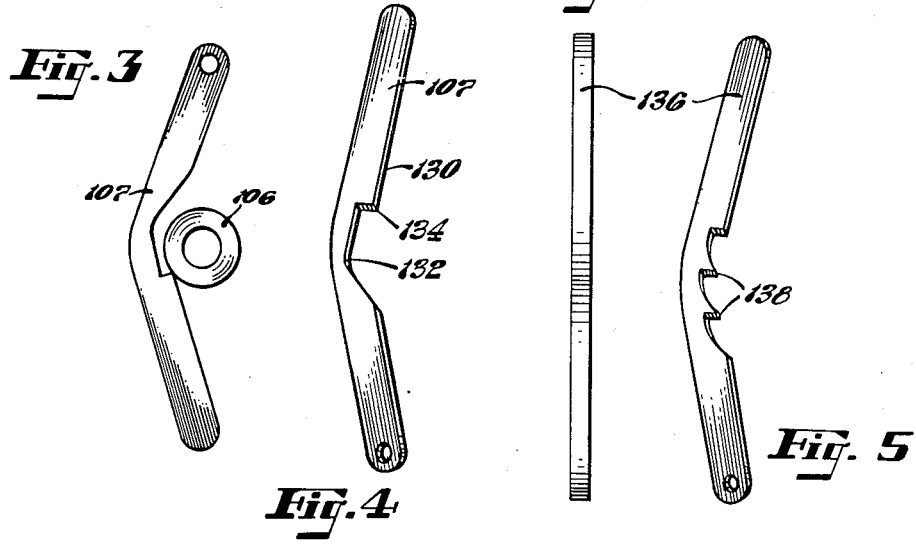

United States Patent Office 2,735,136
Patented Feb. 21, 1956

2,735,136
FOOD PROCESSING MACHINE

Oscar Robert Deckert, Newtonville, Mass.

Original application November 24, 1948, Serial No. 61,798, now Patent No. 2,704,858, dated March 29, 1955. Divided and this application October 27, 1953, Serial No. 398,136

5 Claims. (Cl. 17—26)

This invention relates to a food processing machine for use in carrying out selective food cutting operations designed to modify and enhance the edibility of foods such as meat, vegetables, and other similar produce. In a preferred embodiment, the invention is exemplified by a selective cutting operation of the sort commonly referred to as "tenderizing" meat in which a piece of meat is passed between a plurality of circular cutting discs so arranged as to come into rolling contact with two opposite sides of the meat and thereby form a multiplicity of closely adjacent slits. The invention is not, however, intended to be limited in its application to meat or any other particular type of food product.

It is a general object of the invention to improve methods and apparatus for processing foods by means of rotary cutting operations of the character indicated. It is also an object to devise scavenging means for a meat tenderizing machine, including special stripper elements.

In accordance with the invention, I provide, in combination with a plurality of disc cutters, an improved stripper design including stripper elements of varying thickness which are adjustably supported in rows so that the rows may be moved toward and away from one another as desired to vary the spacing occurring between them and thus in effect provide for greater or less amounts of pressure as demanded by relatively thick or relatively thin slabs of meat. Another important aspect of the improved stripper design is a scavenger arrangement consisting of recessed edges formed on the rear surfaces of the stripper elements and located in a position to engage against and clean the peripheral surfaces of immediately underlying spacer elements disposed between adjacent cutter elements.

These and other objects and novel features will be more fully understood and appreciated from the following description of a preferred embodiment of the invention selected for purposes of illustration and shown in the accompanying drawings, in which Fig. 1 is a plan view illustrating the food processing machine of the invention with the stripper elements removed with sections of the casing swung outwardly and portions of the top and cover broken away to disclose a pair of multiple disc cutters and supporting and driving means for these members;

Fig. 2 is an end elevational view of the multiple cutting rolls and supporting frame showing the stripper elements of the invention inserted between the rolls and arranged in a scavenging position;

Fig. 3 is a detail view illustrating a stripper element and spacer removed from the machine;

Fig. 4 and Fig. 5 are detail views of modified forms of stripper elements which may be employed in the invention; and Fig. 6 is a rear elevational view of the stripper element shown in Fig. 5.

Figure 1:
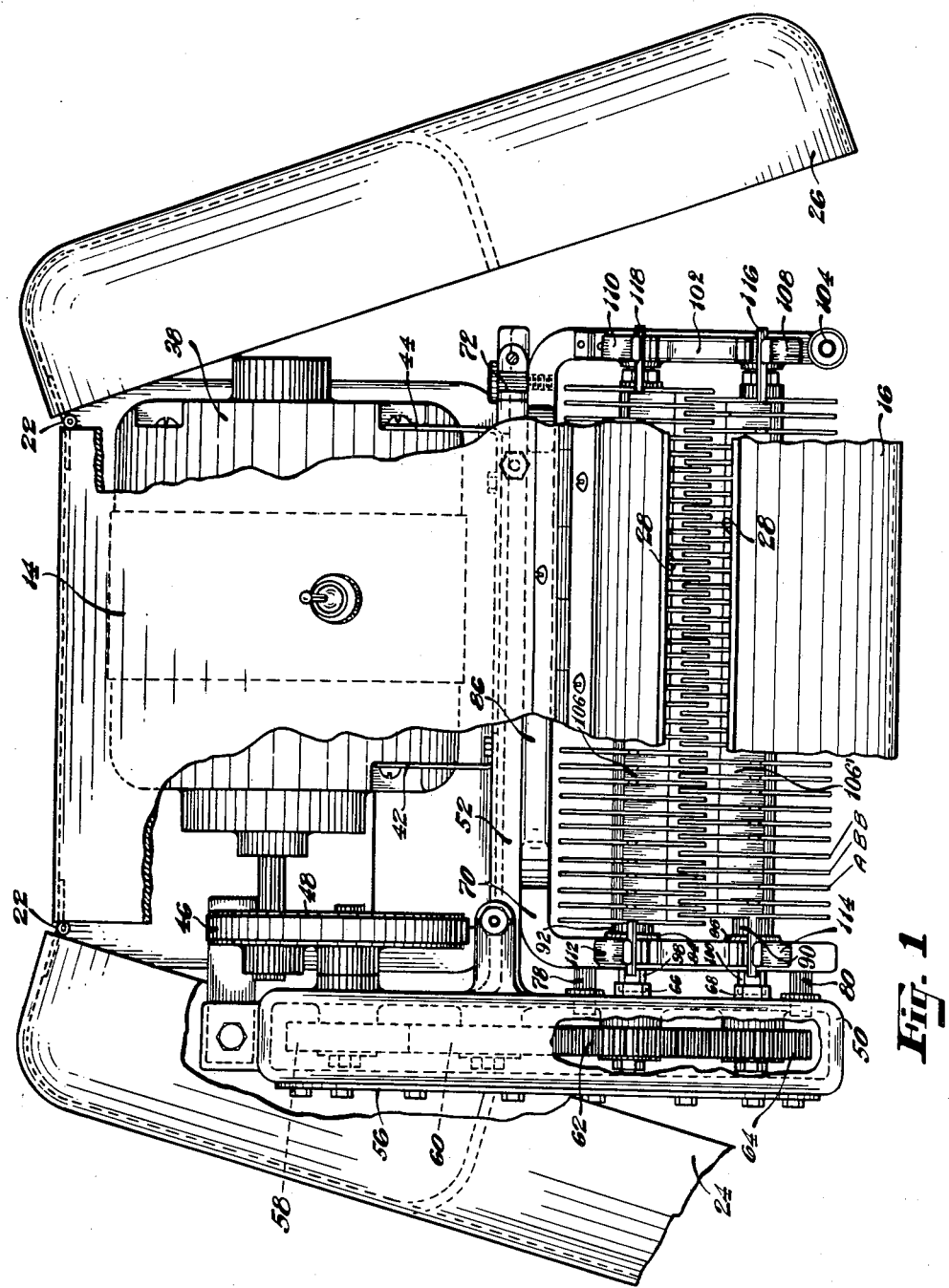

Generally speaking the principal parts of the machine include a casing, and a pair of multiple cutting rolls together with spacers and stripper elements and mechanism for receiving and driving the cutting rolls, and this structure will be described with reference to tenderizing meat as one preferred application of the invention, having in mind especially facilities for processing two or more small portions of meat so that the small pieces may be interwoven and firmly pressed together to form a more nearly standard size slice of meat.

Thus in the structure shown in Figs. 1, I have shown a casing having a base on which is supported a central wall portion 14 and two pivoted side enclosures 24 and 26 hinged at points as 22.

Mounted inside the panels 14, 24 and 26 on the base of the casing is an electric motor 38. Motor 38, through a belt 46, drives a pulley 48 which is rotatably mounted in an extension 50 of a transverse bearing member 52 solidly secured along the upper side of the casing as shown in Fig. 1. The bearing 52 preferably consists of a metal casting with the extension 50 being recessed to provide an open gear housing which is normally closed by a cover 56. Located within the housing are a series of gears 58, 60, 62 and 64, driven by the pulley 48 as illustrated in Fig. 1. The gears 62 and 64 actuate hexagonal drivers 66 and 68, rotatably mounted through the bearing extension 50 as shown.

An interesting aspect of the bearing extension 50 is its arrangement substantially at right angles to the main body of the bearing 52 so that the bearing presents a projecting portion defining an angular enclosure. Within this angular enclosure is adjustably supported a U-shaped carrier frame 70, which includes two relatively short legs and a relatively long connecting portion for the legs. The connecting portion referred to is snugly fitted against one side of the bearing 52, as suggested in Fig. 1, and is provided with a stud 72, preferably threaded transversely therein. The stud 72 is arranged to engage in a slot 74 (Fig. 7) formed in the upper surface of bearing 52 and thus support one end of the U-shaped frame. The opposite end of the frame 70 is supported at two other points by means of pins 78 and 80 fixed therein and adapted to engage in oversize openings in the bearing extension 50 (Fig. 1). In this relative position the frame is readily disengaged from the hexagonal drivers. A handle 86 provides a convenient means of grasping and lifting out the frame in the manner described. Journaled within the two opposite ends of carrier frame 70 are a pair of multiple cutter rolls 90 and 92. At the frame end of the left-hand side of Fig. 1, as viewed in the drawings, the rolls 90 and 92 are received in bearing sleeves 94 and 96 and present hexagonal extremities 98 and 100 which are engaged with correspondingly shaped drivers adapted to be slidably engaged therearound. I may also resort to various other conventional driving mechanisms for rotating the cutter rolls 90 and 92. The opposite ends of rolls 90 and 92 are removably supported in the frame between a lower section thereof and a hinged upper section 102 adjustably secured by means of a pivoted locking member 104.

Arranged on the two rolls 90 and 92 in alternating relationship, as shown in Fig. 1, are two rows of disc cutters and circular spacers. The spacers are denoted by the numerals 106 and 106' and are of the same general character in each of the two rows. These cutters may be of the standard disc type commonly employed in meat tenderizing machines and well known in the art. As shown in Fig. 2, I provide a series of stripper elements 107 arranged in two opposite rows and suspended above the cutter rolls 92 and 94, in a position to occupy the spaces between adjacent cutters. In accordance with the invention, however, both the stripper design and the means for supporting the stripper elements have been improved as is disclosed in Figs. 2 to 6, inclusive. In the figures noted, it will be seen that the frame 70 is provided at either end thereof with two pairs of arms 108 and 110, 112 and 114, all of which are shown in Fig. 1. The arms extend upwardly and outwardly well beyond the axes of the two rolls 90 and 92 to support two transverse stripper bars 116 and 118 (see Fig. 2) in an inclined position in which each stripper element bears against a spacer as suggested in dotted lines in Fig. 2. In this position the strippers of respective rows present a substantially uniform spaced-apart relation to constitute a guideway for receiving and passing pieces of meat between the cutters. In this structure means are provided for varying the spacing between the rows by forming strippers of varying width and adjustably supporting them in rows so that each row can be raised or lowered and in so doing approach or move away from one another.

As illustrative of one preferred embodiment of such a stripper arrangement, the arms 108, 110, 112 and 114 may be provided with an additional pair of stripper roll supporting slots as 120 and 122, as indicated in Fig. 2. As will be noted from an inspection of the stripper element 107 shown in Fig. 3 and Fig. 4, this member along the edge 130 which normally lies nearest to its spacer has been relieved to provide a recessed face 132, with the result that the width of the stripper along its mid-section is materially decreased.

Assuming that the relative position of a stripper when supported in the uppermost set of slots is such as to cause the edge 130 to bear on a spacer, it will readily be seen that by lowering the stripper into the position it assumes when supported in the second set of slots as 120, 122, the recessed edge 132 comes to bear on the spacer and in so doing moves outwardly a substantial distance. In the case of two rows of strippers, there will thus be secured a considerable increase in the spacing between them. This adjustment materially aids the stripper mechanism to properly support meat as it passes through the cutters especially when varying thicknesses of meat are encountered and thus secure a maximum amount of cutting and weaving together of the meat portions.

When formed in the manner shown in Figs. 3 and 4, the improved stripper design of the invention offers still another novel function consisting of the scavenging or cleaning function noted at an earlier point in the specification and dealing with the spacers 106. It will be observed that the recessed edge 132 terminates abruptly to form a sharp shouldered portion which constitutes a scavenging edge 134. This edge may conveniently be adjusted to come into contact with the peripheral surface of its respective underlying spacer in the manner suggested in Fig. 2 and in this position the edge maintains the spacers in a cleanly scraped condition, thus preventing the accumulation of small bits of meat at these inaccessible points. If desired, the stripper design may be altered to take a form such as that illustrated in Figs. 5, 6, in which is shown a stripper element 136 having a plurality of cleaning or scavenging edges 138 arranged to come into contact with an adjacent spacer surface at varying angles.

The strippers further provide a secondary scavenging effect on the sides of adjacent disc cutters. The scavenging action is obtained by employing a stripper member of square cross section instead of round wire cross sections heretofore used. It will be readily seen that these square edges can be directed as scrapers along the cutter disc sides and prevent accumulation of particles of meat or dirt.

In a similar manner to the foregoing procedure for handling pieces of meat, it may also be desired to utilize the machine for cutting foods such as raw vegetables and combining small portions of various substances intimately together to form novel food products such as salads and other preparations. In this connection, the form of the cutter rolls, including the disc cutters and the stripper members, may be modified in various respects in keeping with the scope of the invention as defined by the appended claims.

Having thus disclosed my invention and described in detail illustrative embodiments thereof, I claim as new and desire to secure by Letters Patent:

1. In a meat tenderizing machine, a casing, a motor located in the casing, a transverse bearing member secured at the front side of the casing and supporting a gear mechanism driven by the motor, a U-shaped carrier frame cradled in the bearing member, a pair of multiple cutter rolls journaled in the carrier frame and being operatively connected to the gear mechanism, each cutter roll bearing a plurality of disc cutters and intervening spacers and a series of stripper elements adjustably supported between the disc cutters, said stripper elements being formed with scavenging edges arranged to engage against the spacers and remove material therefrom when the spaces are rotated by the said motor.

2. In a meat tenderizing machine, a casing, a motor in the casing, a pair of rolls supported in the casing in position to be rotated by the motor, a series of annular cutters mounted on the rolls, a plurality of intervening spacers located on the shaft for maintaining the cutters in spaced-apart relation, a plurality of stripper elements being recessed to provide varying widths and suspended between adjacent cutters in two opposite rows and normally resting against the spacers, means for raising and lowering the two rows of stripper elements thereby to vary the horizontal spacing between respective rows, said stripper elements presenting scraping edges for removing material collecting on the spaces during rotation.

3. In a meat tenderizing machine, a casing, a motor in the casing, support means for receiving a gear mechanism driven by the motor, a replaceable frame horizontally disposed on the support means, a pair of rolls journaled in the frame in position to be driven by the gear mechanism, a series of disc cutters and spacers mounted on the rolls in spaced relation to one another, vertical stripper elements suspended in two opposite rows between adjacent pairs of cutters, said stripper elements presenting scavenging edges arranged to bear against the spaces and means for raising and lowering the stripper elements, said means including rods extending transversely through the upper extremities of the stripper elements, the ends of the rods being supported between pairs of supporting arms which extend upwardly from opposite sides of the frame, said supporting arms being formed with recessed bearing edges located in offset relation for varying the height at which the stripper elements are located, and changing the angle of engagement of the scavenging edges with the spaces.

4. In a meat tenderizing machine, a casing, a motor in the casing, a pair of rolls supported in the casing in a position to be rotated by the motor, a series of cutters mounted on the rolls, a plurality of intervening spacers located between the cutters, vertical stripper elements suspended between adjacent cutters in two opposite rows normally resting against the spacers, each of the stripper elements having rear surfaces recessed to define a scavenging edge which is adapted to engage against and clean a respective underlying spacer surface, when the spacers are rotated.

5. In a meat tenderizing machine, a casing, a motor in the casing, a pair of rolls supported in the casing in a position to be rotated by the motor, a series of cutters mounted on the rolls, a plurality of intervening spacers located between the cutters, vertical stripper elements suspended between adjacent cutters in two opposite rows normally resting against the spacers, each of the stripper elements having rear surfaces recessed to define a plurality of scavenging edges which are adapted to engage against and clean respective underlying spacer surfaces, when the spacers are rotated by the motor.

References Cited in the file of this patent

UNITED STATES PATENTS

| Number | Name | Date |
|---|---|---|
| 2,163,123 | Huse | June 20, 1939 |
| 2,409,463 | Ahrndt | Oct. 15, 1946 |
| 2,472,800 | Ahrndt | June 14, 1949 |